US008967108B2

(12) United States Patent
Fein et al.

(10) Patent No.: US 8,967,108 B2
(45) Date of Patent: Mar. 3, 2015

(54) ELECTRIC MACHINE COMPRISING ELECTRIC TERMINALS, PLUG AND PLUG-IN CONNECTION

(75) Inventors: Mathias Fein, Besigheim-Ottmarsheim (DE); Reiner Hirning, Eberdingen-Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 1040 days.

(21) Appl. No.: 13/002,401

(22) PCT Filed: Jul. 2, 2009

(86) PCT No.: PCT/EP2009/058358

§ 371 (c)(1), (2), (4) Date: Feb. 22, 2011

(87) PCT Pub. No.: WO2010/000821

PCT Pub. Date: Jan. 7, 2010

(65) Prior Publication Data

US 2011/0168115 A1 Jul. 14, 2011

(30) Foreign Application Priority Data

Jul. 3, 2008 (DE) ......................... 10 2008 040 107

(51) Int. Cl.

*F02N 11/00* (2006.01)
*H01R 24/66* (2011.01)
*H01R 24/20* (2011.01)
*H02K 13/00* (2006.01)
*H02K 15/00* (2006.01)
*H01R 13/621* (2006.01)
*H01R 13/627* (2006.01)
*H01R 103/00* (2006.01)

(52) U.S. Cl.

CPC ................ *H01R 24/66* (2013.01); *F02N 11/00* (2013.01); *H01R 24/20* (2013.01); *F02D 2400/22* (2013.01); *H01R 13/621* (2013.01); *H01R 13/627* (2013.01); *H01R 2103/00* (2013.01); *H01R 2201/10* (2013.01); *H01R 2201/26* (2013.01)

USPC ........................... 123/179.1; 310/71; 439/660

(58) Field of Classification Search

CPC ............................. H01H 51/065; H01H 50/14
USPC ........ 123/179.1; 335/126, 202; 439/628, 660, 439/521, 449, 892; 310/12–14, 71
See application file for complete search history.

(56) References Cited

U.S. PATENT DOCUMENTS 5,338,898 A * 8/1994 Luciano et al. ............... 439/521
5,909,067 A * 6/1999 Liadakis ......................... 310/14
5,939,960 A * 8/1999 Godel et al. .................. 335/126

FOREIGN PATENT DOCUMENTS

EP 0506624 A2 9/1992
EP 0874416 A2 10/1998

(Continued)

OTHER PUBLICATIONS

PCT/EP2009/058358 International Search Report.

*Primary Examiner* — Hieu T Vo

(74) *Attorney, Agent, or Firm* — Michael Best & Friedrich LLP

(57) ABSTRACT

Described is an electric machine (1) in a vehicle, in particular a starter or a starting device for starting an internal combustion engine, comprising at first electric terminal (2) and at least one second electric terminal (3). In order to make it easier and less expensive to design and assemble the electric machine in a vehicle, the at least two electric terminals (2, 3) are arranged such that an electric connection to the at least two terminals (2, 3) can be established by means of a connecting device that forms a unit and has at least two electric power cables.

10 Claims, 2 Drawing Sheets

(56) References Cited

FOREIGN PATENT DOCUMENTS

| | | | | | |
|---|---|---|---|---|---|
| GB | 2056786 | A | | 3/1981 | |
| JP | 56104041 | | | 8/1981 | |
| JP | 561456 | | | 8/1993 | |
| JP | 942124 | | | 2/1997 | |
| JP | 200025570 | | | 1/2001 | |
| WO | WO 2004105068 | A1 | * | 12/2004 | ............. H01H 51/06 |

* cited by examiner

ELECTRIC MACHINE COMPRISING ELECTRIC TERMINALS, PLUG AND PLUG-IN CONNECTION

BACKGROUND OF THE INVENTION

The invention relates to an electric machine in a vehicle, in particular a starter or starter device for starting an internal combustion engine, with a first electric terminal and with at least a second electric terminal. The invention also relates to a plug for an electric machine, in particular for an electric machine as described above. The invention also relates to an electric plug-in connection for an electric machine of a motor vehicle, in particular for a starter, and to a production process for a vehicle.

It is known to construct an electric machine, such as a starter in a vehicle, for example, with a meshing relay in a housing. The meshing relay has a first electric terminal, which is driven by an electric ignition device, either manually or by means of electric, time-controlled electronics. The time-controlled electronics are activated by means of a pushbutton, for example, during starting of the motor vehicle. The meshing relay is driven by a low current in relation to a high current which is required for starting the internal combustion engine using the starter. The meshing relay usually closes a switch in the circuit of the starter, with the result that current is supplied to the starter for rotating the meshing pinion. A second electric terminal is therefore located at the meshing relay in order to connect the high current for the starter. The second electric terminal is connected directly to the electric energy source, i.e. a vehicle battery. These two terminals are connected to separate cable lugs on electric power lines. In addition, at the meshing relay a power cable leads from the switch to the electric machine. The terminals at the starter are arranged clearly separated from one another owing to the different functions with their different circuits and the differently designed power lines.

SUMMARY OF THE INVENTION

The object of the invention is to develop an electric machine, a plug, a plug-in connection and a production process of the type mentioned at the outset in such a way that the construction and fitting of the electric machine in a vehicle are simplified and are more cost-effective.

The concept of the invention is to combine the at least two electric terminals and therefore to reduce significantly the amount of time required for fitting, and to simplify the fitting process, on the electric machine in the vehicle, in particular on the starter or a starting device, in vehicle production. A starting device can include a switching device which controls, in switchable fashion, the starter in accordance with a preferred embodiment. The starter pinion can be caused to mesh by means of a meshing relay. In accordance with other embodiments, the starter pinion is always in contact with a ring gear of an internal combustion engine or is engaged in or disengaged from the ring gear by a particular switching device.

The object with respect to an electric machine is achieved in that the at least two electric terminals are arranged in such a way that a terminal connecting device with at least two electric power lines can be used to produce an electric connection to the terminals. By means of a unit which forms the terminal connecting device, the fitting time for the electric terminals on the electric machine is therefore reduced by at least half. By producing electric contact with one terminal, electric contact is immediately also made with at least the second terminal. A relatively simple, compact design which saves on installation space is possible. In addition, during fitting by the fitter, so-called blind assembly of the terminals with the terminal connecting device is possible in a simplified manner since a relatively large terminal connecting device is connected to the existing terminals.

In accordance with a particularly preferred embodiment, the electric terminals are formed with a receiving position which receives the terminal connecting device, in particular a plug, in a single, defined receiving position, in order to ensure 100% correct assembly and to completely avoid the possibility of incorrect assembly.

In accordance with an embodiment as a development of the invention, for this purpose the receiving position is fixed by differently formed cross sections of the electric terminals. This is a particularly simple configuration for producing a defined receiving position. At the same time, the terminals are designed in terms of function, i.e. for the terminal which requires a relatively high current, the terminal is designed correspondingly with a relatively large cross section, and a terminal with a relatively low current, for example for the control current of a control device, such as the meshing relay, is formed with a correspondingly smaller cross section.

In accordance with preferred embodiments, the electric terminals are round, flat, rectangular and/or polygonal. Round terminals can be manufactured easily, angular, for example triangular, quadrilateral or polygonal terminals, provide a defined, unique, noninterchangeable receiving position.

In accordance with a particularly inexpensive and simple embodiment, the electric terminals are in the form of bolts.

Advantageously, the terminal connecting device is in the form of a female plug for receiving at least two male terminals. The device from which the current is transmitted is therefore a receiving device which does not have any outwardly protruding, electrically conducting contact areas. Thus, the risk of an accident occurring when the terminal connecting device is fitted or detached is prevented if, atypically, the terminal connecting device should nevertheless become energized.

In order to simplify fitting, it may be preferable for it to be possible for the electric terminal connection to be positioned on the pole housing, drive mount, commutator mount or a switching device, in particular a meshing relay, irrespective of the structural requirements.

In order that the terminal connecting device holds together firmly at the terminals during operation of the vehicle over the entire life of the vehicle, the electric terminal connecting device can be secured by being latched in and/or clamped.

The object with respect to a plug is also achieved by the fact that the plug has a terminal connecting cable with at least two electric power lines, the plug having at least one power line for a device for driving the electric machine and one power line for supplying current to the electric machine. With the plug and the electric machine, an anti-torque device is no longer required during fitting since the plug is simply plugged onto the existing terminals. The plug provides additional protection against corrosion. In addition, it results in an esthetically pleasing design with a uniform appearance and simple shapes in clear lines. Also, potential problems with installation space in the vehicle engine compartment are solved by a flat plug. The plug can be installed 100% correctly, as described above. Therefore, the wiring of a vehicle is made much easier and can be performed quickly since electric contact is provided simultaneously at two terminals by means of a single fitting procedure.

In accordance with an alternative, preferred embodiment, the object with respect to an electric plug-in connection can also be achieved in that the electric plug-in connection is formed with at least a first adapter part, which can be fastened, particularly preferably screwed, to an electric machine, in particular a starter.

In accordance with a particularly preferred embodiment, the electric plug-in connection is formed with a second adapter part, a terminal connecting cable with at least two electric power lines being formed on the first or second adapter part, particularly preferably the first adapter part being a plug receptacle and the second adapter part being a plug. The two adapter parts can be assembled in a form-fitting manner, with the result that electric contacts at the electric terminals in the two adapter parts are closed. Further preferably, the terminals of the first and second adapter parts are formed in accordance with the above-described features. The electric plug-in connection has the advantage that it can be positioned on the electric machine, in particular a starter, where it is easiest to fit or detach the electric plug-in connection. It is therefore not essential for it to be tied to the position, for example the rearward end side of the meshing relay.

In addition, the object with respect to a production process is also achieved in that an electric terminal connection to at least two electric terminals and to an electric terminal connecting device is produced in a single fitting procedure. The production process is therefore substantially simplified and made substantially more efficient in comparison with a vehicle with a conventional starter with two different, separate electric terminals.

It goes without saying that the features mentioned above and yet to be mentioned below can be used not only in the respectively given combination, but also in other combinations.

BRIEF DESCRIPTIONS OF THE DRAWINGS

The invention will be explained in more detail below using exemplary embodiments with reference to drawings, in which.

DETAILED DESCRIPTION

Figure 1:
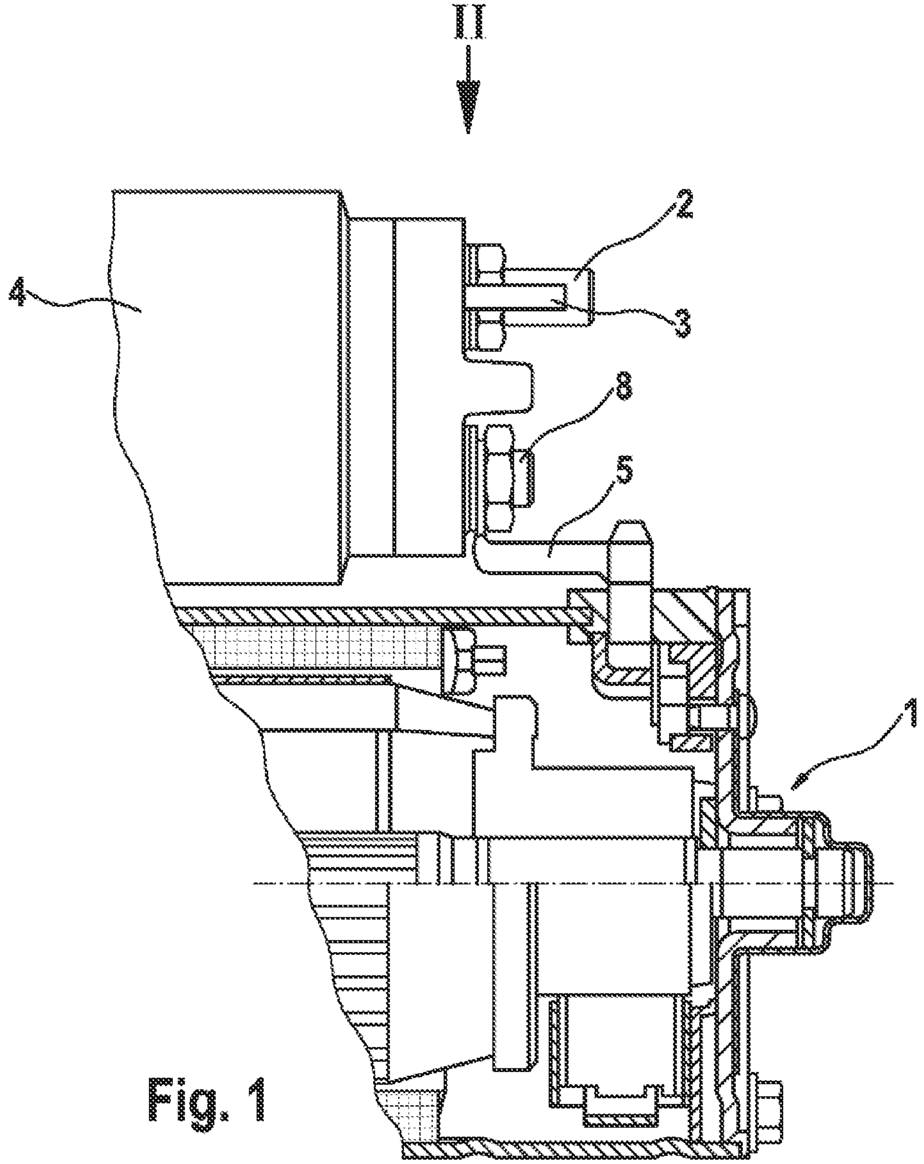
FIG. 1 shows a detail of a side view of a starter device with a starter.

FIG. 1 shows, in simplified and schematic form, a detail of a starting device of an electric machine 1, which is in the form of a starter for an internal combustion engine of the motor vehicle. As shown in FIG. 1, a meshing relay 4 is arranged locally above the electric machine 1, with a first electric terminal 2, which is larger at the rearward, end-side end, and a second relatively small electric terminal 3. The meshing relay 4 causes a meshing pinion (not shown) of the electric machine 1 to mesh when an electric current is flowing at the second terminal 3 as a result of an ignition which is initiated by a driver. The meshing relay 4 closes a circuit of the electric machine 1 when the armature (not illustrated) is drawn in, with the result that electric energy is supplied to said electric machine and the meshing pinion rotates in order to start the internal combustion engine. The maximum electric energy from the electric energy source, for example the vehicle battery, is therefore applied to the first terminal 2. If the electric switch in the meshing relay 4 is closed, which forms the switch, an electric current flows from the rearward end of the meshing relay 4 into the starter via a power cable 5 from the bolt 8.

Figure 2:
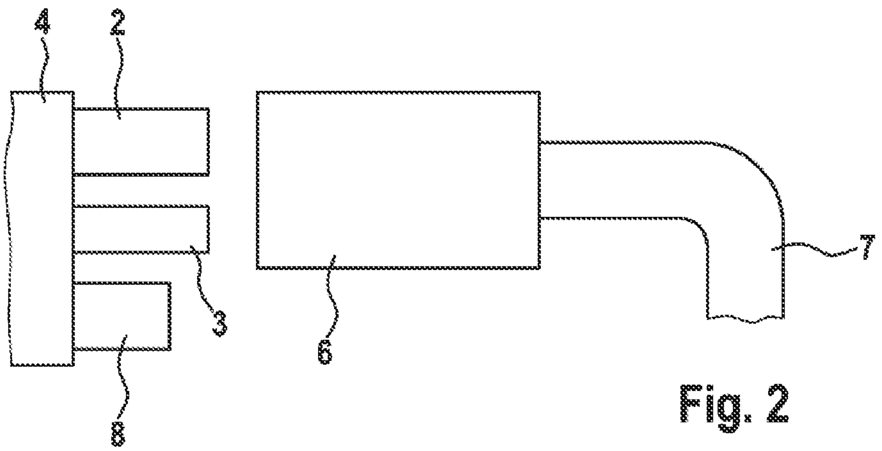
FIG. 2 shows a plan view of FIG. 1.

FIG. 2 shows a schematic plan view of FIG. 1. The first terminal 2, which is in the form of a bolt and draws the current for the electric machine 1, is located at the rearward end-side end of the meshing relay 4. Next to this, a relatively small bolt with the second terminal 3 is formed. The differently sized cross sections of the first terminal 2 and the second terminal 3 result in a precisely defined, single receiving position for the plug 6. The plug 6 has a terminal connecting cable 7 with at least two electric power lines, which are sheathed with a resistive plastic in accordance with the ambient requirements. A power line on the plug 6 is provided for driving the meshing relay 4 as the device for driving the electric machine 1 and a second power line is used for supplying current to the electric machine 1.

A bolt 8, which produces an electric connection to the power cable 5, is arranged on the end-side outer surface of the meshing relay 4, parallel to the first terminal 2 and the second terminal 3. The plug 6 has a female form for receiving the two male electric terminals 2 and 3. A process for producing a vehicle with a starter is markedly simplified since, in a single fitting procedure with a plug 6 as the terminal connecting device, an electric terminal connection can be produced between the electric terminals 2, 3 and the plug 6.

Figure 3:
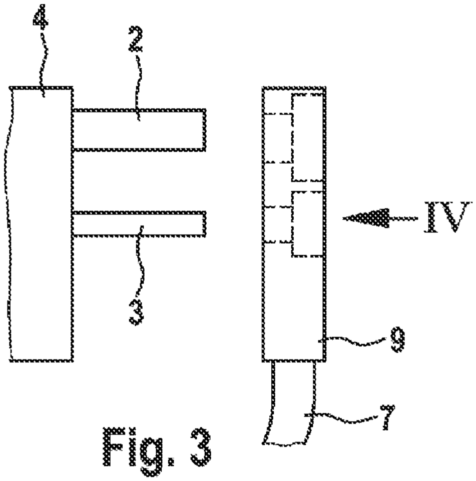
FIG. 3 shows an alternative embodiment to FIG. 2 in a side view.

FIG. 3 shows an alternative embodiment to FIG. 2. In FIG. 3, the terminal connecting device is in the form of an adapter 9. The adapter 9 with a terminal connecting cable 7 can be screwed onto the meshing relay 4 with the first terminal 2 and the second terminal 3. In this embodiment, the first terminal 2 is designed to be much stronger than the second terminal 3. In the embodiment in FIG. 3, either the terminals 2 and 3 are screwed to bolts or the bolts are screwed, in the form of screws, to the meshing relay 4.

Figure 4:
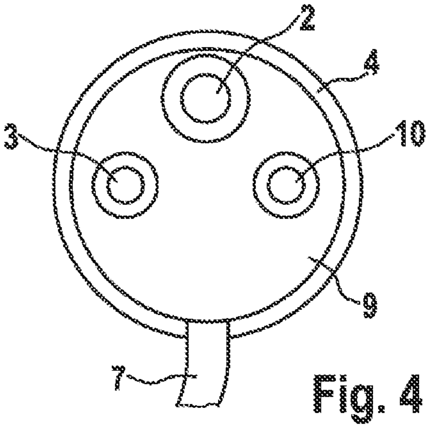
FIG. 4 shows an end view of FIG. 3.

FIG. 4 shows an end view of FIG. 3 of the meshing relay 4 with the adapter 9. It is clear from FIG. 4 that, in addition to the first terminal 2 and the second terminal 3, at least a third electric terminal 10 is provided, which is likewise screwed to the meshing relay 4. The at least one further, third terminal 10 is used, for example, for driving a meshing relay 4 with a pull-in winding and a holding winding in a defined manner.

In addition to the third terminal 10, further terminals are possible for performing further functions for driving the meshing relay 4 or the starter. In accordance with an alternative embodiment, a terminal connecting cable 7 or a fixed busbar leaves the adapter 9.

All of the figures show merely schematic illustrations which are not true to scale. Moreover, reference is made in particular to the illustrations in the drawing as being essential to the invention.

The invention claimed is:

1. In combination, an electric machine (1) and a terminal connecting device (6, 9) in a vehicle, the electric machine (1) including at least a first electric terminal (2) and at least a second electric terminal (3), characterized in that the at least two electric terminals (2, 3) are arranged in such a way that the terminal connecting device (6, 9) with at least two electric power lines produces an electric terminal connection to both of the at least two terminals (2, 3) with a single connection, wherein the at least two electric power lines include at least one power line for a device for driving the electric machine (1) and one power line for supplying current to the electric machine (1), and wherein the terminal connecting device (6, 9) further includes a terminal connecting cable (7) including both of the at least two electric power lines.

2. The combination as claimed in claim 1, characterized in that the electric terminals (2, 3) are formed in a receiving position which receives the terminal connecting device (6, 9) in a single defined receiving position.

3. The combination as claimed in claim 1, characterized in that the receiving position is fixed by differently formed cross sections of the electric terminals (2, 3).

4. The combination as claimed in claim 1, characterized in that the cross sections of the electric terminals (2, 3) are round, flat, rectangular and/or polygonal.

5. The combination as claimed in claim 1, wherein the terminal connecting device includes a female plug (6) provided at the end of the terminal connecting cable (7) for receiving at least two male terminals (2, 3).

6. The combination as claimed in claim 1, characterized in that the electric terminal connection is arranged on the pole housing, drive mount, commutator mount or meshing relay (4).

7. The combination as claimed in claim 1, characterized in that the electric terminal connection can be secured by being latched in and/or clamped.

8. The combination as claimed in claim 1, wherein the machine is a starter or starting device for starting an internal combustion engine.

9. The combination as claimed in claim 1, characterized in that the cross sections of the at least two electric terminals (2, 3) are round, flat, rectangular and/or polygonal, and the electric terminals are bolts.

10. The combination as claimed in claim 1, characterized in that the at least two electric terminals (2, 3) are bolts.

* * * * *